United States Patent [19]

Hirata

[11] 3,868,563
[45] Feb. 25, 1975

[54] VOLTAGE REGULATOR FOR GENERATOR
[75] Inventor: Tsuyoshi Hirata, Himeji, Japan
[73] Assignee: Mitsubishi Denki Kabushiki Kaisha, Tokyo, Japan
[22] Filed: Dec. 30, 1968
[21] Appl. No.: 787,680

[30] Foreign Application Priority Data
  Jan. 11, 1968 Japan.................................. 43-1664

[52] U.S. Cl. ....................... 322/28, 320/68, 322/73
[51] Int. Cl. .............................................. H02p 9/30
[58] Field of Search ................... 322/28, 73; 320/68

[56] References Cited
UNITED STATES PATENTS

| | | | |
|---|---|---|---|
| 3,273,049 | 9/1966 | Shano | 322/28 |
| 3,324,383 | 6/1967 | Raver | 322/28 X |
| 3,376,497 | 4/1968 | Lund | 322/28 |
| 3,439,255 | 4/1969 | Carnes et al. | 322/28 |
| 3,463,997 | 8/1969 | Dietl et al. | 322/28 X |
| 3,532,962 | 10/1970 | Balcke et al. | 322/28 |
| 3,560,840 | 2/1971 | Stalp | 322/28 |
| 3,602,797 | 8/1971 | Bleher | 322/28 |
| 3,659,188 | 4/1972 | Alexander et al. | 322/28 |

*Primary Examiner*—James D. Trammell
*Attorney, Agent, or Firm*—Robert E. Burns; Emmanuel J. Lobato; Bruce L. Adams

[57] ABSTRACT

A rectified output voltage from an ac generator is applied to a fixed resistor and a variable resistor serially connected with the voltage below a predetermined magnitude, an excitation is applied to the generator through a transistor in conducting state. Upon the voltage exceeding that magnitude the transistor become nonconducting through conduction of a transistor and a reference diode element serially connected across the fixed resistor to interrupt the excitation. The fixed resistor, the last-mentioned transistor and the reference element with or without the first-mentioned transistor are formed into an integrated circuitry. The variable resistor is outside of the circuitry.

4 Claims, 3 Drawing Figures

3,868,563

1

VOLTAGE REGULATOR FOR GENERATOR

BACKGROUND OF THE INVENTION

This invention concerns a voltage regulator operatively coupled to a generator and particulary to a generator equipped on an automobile.

The generator referred to is typically one normally driven by an engine for driving an automobile to charge a storage battery also equipped on the latter. Such generators have been previously of the direct current type but the existing generators mostly employed one of the combined alternating current generator and rectifier type. In either case, the generator has a voltage regulator operatively coupled thereto for the purpose of substantially adjusting an output voltage from the same to a predetermined level. The voltage regulator serves to prevent the output voltage from the generator from much increasing due to a variation in the number of rotation of the associated engine whereby the output voltage is substantially adjusted to a predetermined constant level ensuring that a storage battery involved is effectively charged. If a generator is not operative to charge a storage battery the associated voltage regulator functions to prevent an excessive voltage from being applied by the generator to its load for protection purpose.

The abovementioned generators for use with automobiles are required to have their sizes as small as possible which is, in turn, accompanied by the associated voltage regulators being also small-sized. The voltage regulators are additionally necessary to be improved in reliability of operation. These requirements have tended to transistorize the voltage regulators by using transistors in place of switching elements in the regulators. There have been lately proposed attempts to form circuit elements of the voltage regulators into integrated circuits.

In the voltage regulators including integrated circuits, it is desirable to permit a magnitude of adjusting voltage to be readily controlled in order to compensate for small differences in electric characteristics from one to another generator as manufactured. With any voltage regulator including circuit elements formed into an integrated circuitry it is practically difficult to externally adjust the integrated circuitry. Thus it is difficult to change a magnitude of adjusting voltage.

SUMMARY OF THE INVENTION

Accordingly, it is an object of the invention to provide a new and improved voltage regulator for use with a generator including an integrated circuitry and capable of readily changing a magnitude of adjusting voltage.

Briefly, the invention accomplishes this object by the provision of a voltage regulator device wherein at least one portion of a resistance included in a circuit for sensing an output voltage from the associated generator is formed of a single component separated from an integrated circuitry which, in turn, include circuit components in number as great as possible forming the device. The resistance connected in the voltage sensing circuit is effective for changing a magnitude of adjusting voltage controlled by the regulator device.

2

BRIEF DESCRIPTION OF THE DRAWING

The invention will become more readily apparent from the following detailed description taken in conjunction with the accompanying drawing in which.

Throughout all the FIGURES like reference numerals designate the corresponding or similar components.

DESCRIPTION OF THE PREFERRED EMBODIMENTS

Figure 1:
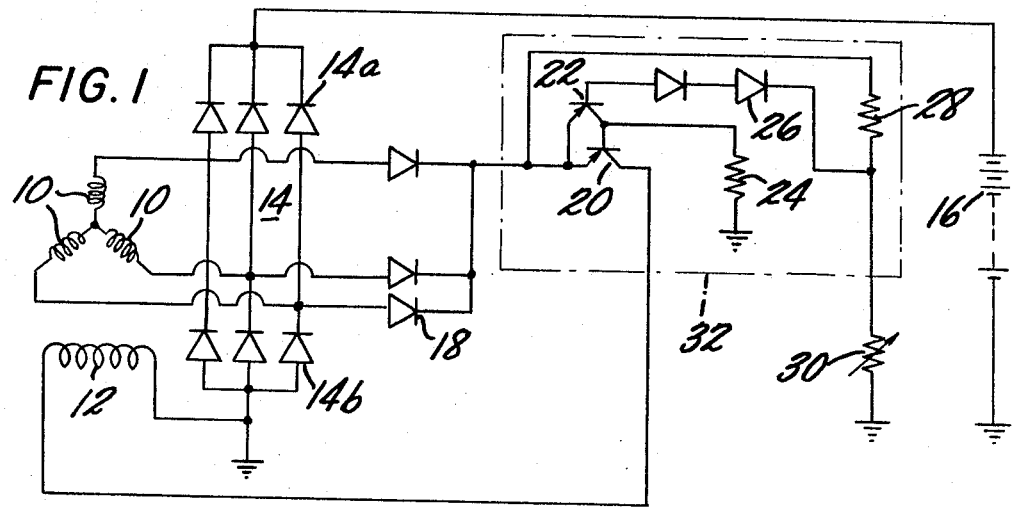
FIG. 1 is a schematic electrical circuit diagram of one embodiment constructed in accordance with the voltage regulator of the invention.

Referring now to the drawing and particularly to FIG. 1 it is seen that three wye-connected windings 10 form a generation winding of a three phase generator including a field winding 12. The generator is adapted to be driven by a prime mover such as, for example, an internal combustion engine equipped on a motor vehicle although the engine and vehicle are not illustrated only for purpose of simplification. The generation winding has a three phase full-wave rectifier device 14 connected thereto to provide a full-wave rectified output with the negative output terminal connected to a chassis (not shown) serving as the ground. Specifically, each of the wye-connected windings 10 is connected at one end to an anode of one semiconductor diode 14a having a cathode connected to the positive terminal of a storage battery 16 and also to a cathode of one semiconductor diode 14b having an anode connected to the ground. The battery 16 is also equipped on the motor vehicle and has a negative terminal connected to the ground to which is also connected one end of the field winding 12.

As shown in FIG. 1, three semiconductor diodes 18 have anodes connected to the junctions of the wye-connected windings and the associated diodes 14b respectively to form another full-wave rectifier device along with those diodes 14b.

The cathodes of the diodes 18 are connected together and to an emitter of a transistor 20 shown as being of the NPN type and having a collector connected to the other end of the field winding 12. The transistor 20 has a base connected to a collector of a switching transistor 22 shown as also being of the NPN type and having an emitter connected to the emitter of the transistor 20 through a resistor 24. The collector of the transistor 22 is also connected to the ground. The transistor 22 has also a base connected to a reference semiconductor element 26 comprising a plurality, in this case, two of serially connected semiconductor diodes. If a voltage exceeding the total of forward voltage drops across these diodes is forwardly applied to the reference element 26 then it is conducting. The element 26 is connected to the junction of a fixed resistor 28 and a variable resistor 30 serially connected across the full-wave rectifier device 18 and the ground. That is, the switching transistor and reference element 22 and 26 respectively is serially connected across the fixed resistor 28. Thus it will be appreciated that the series arrangement of fixed and variable resistors 28 and 30 respectively forms a circuit for sensing the output voltage from the generation winding 10 full-wave rectified by the full-wave rectifier device 18.

In FIG. 1 a block 32 is shown as including the transistors 20 and 22, the reference semiconductor element 26 and the resistors 24 and 26 formed into an integrated circuitry. However it is to be noted that the variable resistor 30 is disposed outside of the integrated circuitry for the purpose as will be apparent. If desired, the variable resistor 30 may be replaced by a fixed resistor. In the latter case, fixed resistors having different magnitudes of resistance may be selectively use to change a magnitude of resistance connected to the resistor 28.

In operation the generator is driven by the associated engine (not shown) to induce an ac voltage across the generation winding 1. The ac voltage is full-wave rectified by the full-wave rectifier device 14 and charge the storage battery 16. At the beginning of rotation of the generator the output voltage from the generator and therefore from the rectifier device 18 is still low so that a voltage drop across the fixed resistor 28 can not render the reference element 26 conducting. This causes the transistor 22 to be maintain in its nonconducting state while the transistor 20 is in its ON state to permit the field winding 12 to be energized by the rectifier device 18.

As the generator increases in the number of rotation the output voltage from the rectifier device 18 increases until it exceeds a predetermined magnitude. At that time the reference element and transistor 26 and 22 respectively become conducting whereupon the transistor 20 turns OFF to interrupt the supply of the exciting current to the field winding 12. This causes the voltage induced across the generation winding 10 to be lowered.

The process as above described is repeated to adjust the output voltage from the generator to a predetermined magnitude dependent upon a voltage with which the reference element 26 becomes conducting.

The generators and integrated circuitries as manufactured may have the different deviations from their standard electric characteristics. Also such electric characteristics may vary during service. It will be appreciated that such deviations and variation can be compensated for by adjusting the magnitude of resistance 30. Alternatively a fixed resistor having a suitable magnitude of resistance may be used for that purpose.

Figure 2:
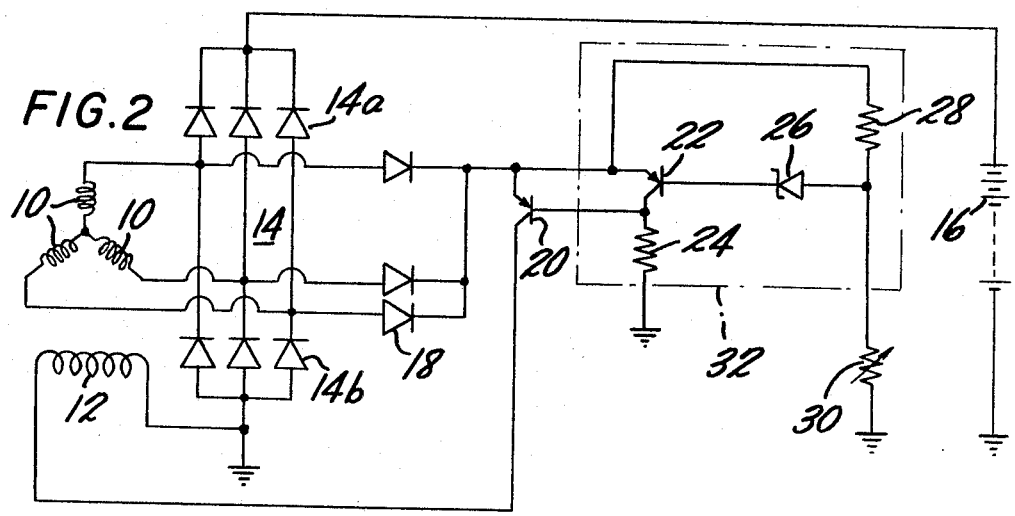
FIG. 2 is a view similar to FIG. 1 but illustrating a modification of the invention.

On arrangement shown in FIG. 2 includes a reference semiconductor element 26 formed of a Zener diode and an NPN type transistor 20 disposed outside of an integrated circuitry. In other respects the arrangement is identical to that illustrated in FIG. 1. The arrangement of FIG. 2 is effective for improving the yield of the integrated circuitry because the transistor 20 is disposed outside of the circuitry.

Figure 3:
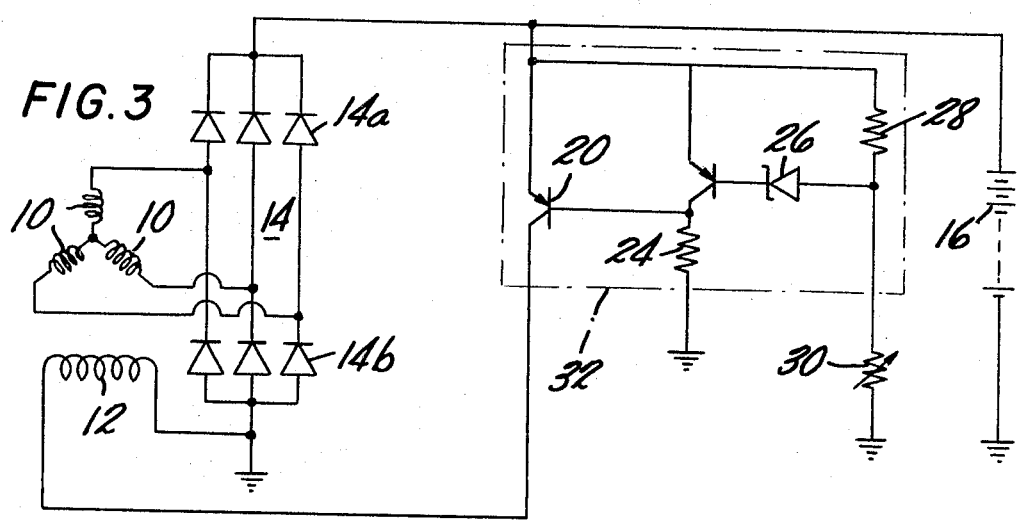
FIG. 3 is a view similar to FIGS. 1 and 2 but illustrating another modification of the invention.

In FIG. 3, a reference semiconductor element 26 is formed of a Zener diode and a full-wave rectifier device 14 serves to energize field winding 12 with the rectifier device 18 as shown in FIGS. 1 and 2 omitted. In other respects the arrangement illustrated is identical to that shown in FIG. 1.

It will be apparent that in FIG. 1, any desired number of semiconductor diodes forming the reference element 26 can readily be formed into an integrated circuitry by the existing technique for producing integrated circuits as does the Zener diode 26 shown in FIG. 2 or 3.

Thus it should be apparent that a new and improved voltage regulator for use with a generator has been disclosed which retains the advantages of an integrated circuitry its self such as the diminution of size, a decrease in weight, a high reliability etc. while easily effecting a change in magnitude of adjusting voltage.

While the invention has been illustrated and described in conjunction with a few preferred embodiments thereof it is to be understood that various changes and modifications may be resorted to without departing from the spirit and scope of the invention. For example, the three phase generator illustrated may be replaced by an ac generator having any desired number of phases. Also instead of the NPN type transistor, a PNP type transistor may be used with the polarity of diodes associated therewith being reversed from that illustrated.

What I claim is:

1. A voltage regulator circuit for a generator having an exciting circuit comprising:
    a. a first transistor and a second transistor, said first transistor and said second transistor each having a pair of conduction electrodes and a control electrode;
    b. a first resistor;
    c. means connecting a first conduction electrode of said first transistor, a first conduction electrode of said second transistor, and said first resistor to a common node;
    d. a diode connected in series with said first resistor and the control electrode of said second transistor, said diode and said first resistor having a common junction therebetween;
    e. a second resistor connected to the common junction of said first resistor and said diode;
    f. a third resistor;
    g. means connecting the control electrode of said first transistor, the second conduction electrode of said second transistor, and said third resistor to another common node;
    h. means applying in use an input voltage from a generator to be regulated to the first mentioned common node;
    i. means defining a circuit path from the second conduction electrode of said first transistor to an exciting circuit of the generator; and
    j. means defining a common conductive path between said second resistor, said third resistor, and the exciting circuit of the generator.

2. A voltage regulator circuit according to claim 1 further comprising a second diode having means connecting said second diode in series with the first mentioned diode.

3. A voltage regulator circuit according to claim 1 wherein said diode is a Zener diode.

4. A voltage regulator circuit according to claim 1 wherein said second resistor is a variable resistor.

* * * * *